Nov. 23, 1926.
A. J. KOEHLER
PULLING DEVICE
Filed Oct. 26, 1925
1,607,957
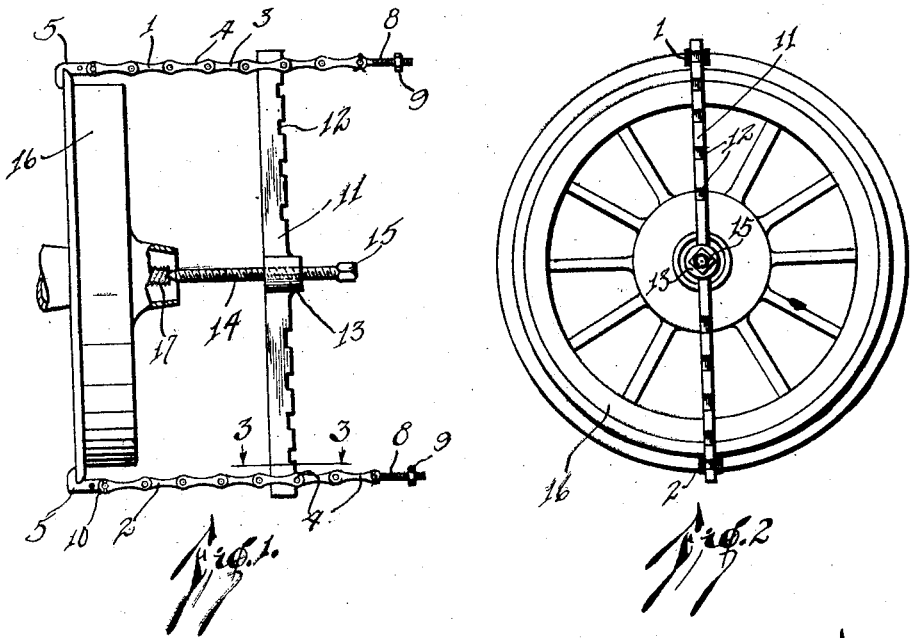
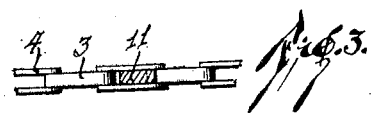
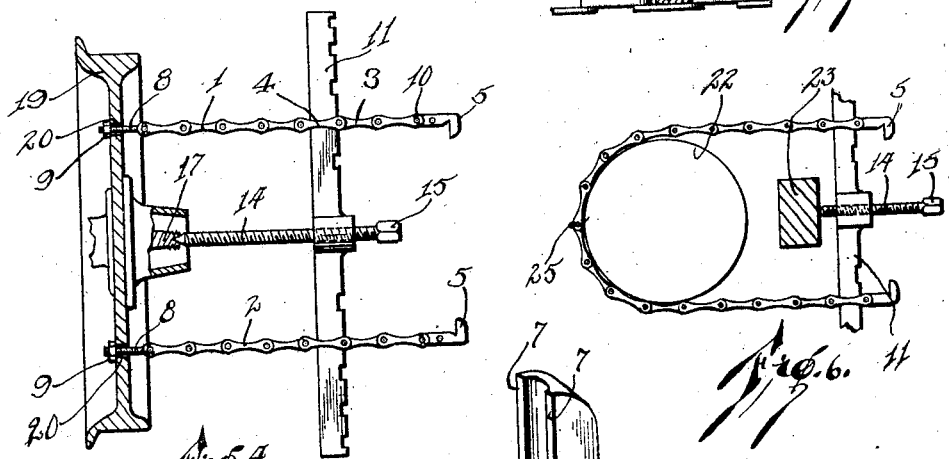
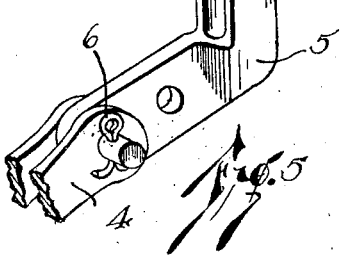
INVENTOR
A. J. Koehler
BY
ATTORNEYS Patented Nov. 23, 1926.

1,607,957

UNITED STATES PATENT OFFICE.

ANTHONY J. KOEHLER, OF CHICAGO, ILLINOIS.

PULLING DEVICE.

Application filed October 26, 1925. Serial No. 64,845.

My invention relates to improvements in pulling devices, and it consists in the combinations, constructions, and arrangements herein described and claimed.

An object of my invention is to provide a pulling device of the character described which is capable of universal application for any work requiring the pulling of one object with respect to another object, such as the removal of wheels from the axle of a shaft, and the pulling forward of a shaft or the like with respect to some fixed member.

A further object of my invention is to provide a pulling device of the character described which is particularly useful for the removal of both artillery and disk type vehicle wheels.

A further object of my invention is to provide a pulling device of the character described which is simple in construction, durable, and which is thoroughly practical commercially.

Other objects and advantages will appear in the following specification, and the novel features of the invention will be particularly pointed out in the appended claim.

My invention is illustrated in the accompanying drawings, forming part of this application, in which—

Figure 1 is a side elevation of my invention in an operative position upon the artillery type of vehicle wheel, a part thereof in section;

Fig. 2 is a front elevation of the mechanism shown in Fig. 1;

Fig. 3 is a sectional view along the line 3—3 of Fig. 1;

Fig. 4 is a view of my improved pulling device in an operative position upon a vehicle wheel of the disk type, a part thereof in section;

Fig. 5 is an enlarged fragmentary view of a portion of the device; and

Fig. 6 is a side elevation of the device in an operative position upon a shaft.

In carrying out my invention I make use of a pair of chains 1 and 2 consisting of alternate solid and split links 3 and 4 respectively. Each chain has a hook member 5 secured to the outermost end thereof by means of a cotter-pin 6, see Fig. 5. The hooks have friction engaging surfaces 7.

The opposite ends of the chains are provided with bolts 8, each having a nut 9 thereon, and are also secured to the chains 1 and 2 by cotter-pins 10. Thus the hooks 5 and bolts 8 may be removed at will.

A cross-bar 11 is provided and has spaced-apart notches 12 at one edge thereof along the entire length of the member. An internally threaded hub member 13 is formed integral with the member 11, and a threaded jack-screw 14 is disposed therethrough. The jack-screw 14 has an angular head 15 by means of which the screw may be turned.

From the foregoing description of the various parts of the device, the operation thereof may be readily understood. In Fig. 1, I have shown an artillery type of wheel 16 disposed upon an axle 17. In removing the wheel 16 from the axle, the hooks 5 are engaged with the peripheral edge of the wheel. The ends of the member 11 are projected through the adjacent slotted links 4, and the jack-screw 14 forced into engagement with the axle 17. Continued rotation of the jack-screw in a clockwise direction will force the wheel 16 from the axle 17.

In Fig. 4, I have shown the manner of attaching my improved pulling device to a disk wheel 19. The chains 1 and 2 are reversed and the bolts 8 projected through openings 20 formed in the wheel 19. The nuts 9 are placed upon the outer ends of the bolts and the member 11 has its outer ends projected through the adjacent split or slotted links 4. Continued rotation of the jack-screw 14 will remove the wheel from the axle 17.

A further application of my improved pulling device is that of moving one body, such as a pipe 22, toward a fixed body, such as a post 23. When the device is used in this manner, the bolts 8 are removed from the chains 1 and 2 and the chains linked together by a cotter-pin 25, see Fig. 6, so as to form a single chain which is wrapped half around the body 22, and has its outer ends engaged with the member 11 in precisely the same manner as shown in Figs. 1 and 4.

The jack-screw 14 is caused to bear upon the member 23, and continued rotation thereof will draw the member 22 toward the member 23, or push the member 23 towards the member 22.

I claim:

A pulling device of the character described comprising a pair of chain members, each consisting of alternate solid and split links, threaded bolts, means for removably securing one end of each of said bolts to one end of each of said chains, means for securing the free ends of said bolts to a disk wheel, a hook removably secured to the opposite end of each of said chains, a cross-bar having an internally threaded hub portion at the midpoint thereof and arranged for projection through the split links, and a jack-screw arranged for transverse movement with respect to the cross-bar, said cross-bar having notches in one edge thereof.

ANTHONY J. KOEHLER.